Feb. 13, 1962   F. LANDER ETAL   3,020,801
DEVICE FOR THE OPTICAL COPYING OF PHOTOGRAPHIC NEGATIVES
Original Filed March 30, 1954   4 Sheets-Sheet 2

INVENTORS
Fred Lander and
Max Lattmann
BY
Michael S. Striker
Attorney

Feb. 13, 1962   F. LANDER ETAL   3,020,801
DEVICE FOR THE OPTICAL COPYING OF PHOTOGRAPHIC NEGATIVES
Original Filed March 30, 1954   4 Sheets-Sheet 4

INVENTORS
Fred Lander and
Max Lathmann
BY
Michael S. Striker
Attorney

United States Patent Office 3,020,801
Patented Feb. 13, 1962

3,020,801
DEVICE FOR THE OPTICAL COPYING OF PHOTOGRAPHIC NEGATIVES
Fred Lander, Bahnhofstrasse 49, Wil, St. Gall, Switzerland, Max Lattmann, Zurich, and Robert Oberacker, Neuchatel, Switzerland; said Lattmann and Oberacker assignors to said Lander
Continuation of application Ser. No. 419,872, Mar. 30, 1954. This application Oct. 7, 1958, Ser. No. 765,851
Claims priority, application Switzerland Apr. 1, 1953
21 Claims. (Cl. 88—24)

The invention relates to a device for the optical copying of photographic negatives, and more particularly for the enlarging thereof.

The present application is a continuation of application Serial No. 419,872, filed March 30, 1954, now abandoned.

It is an object of the present invention to provide a device of the kind referred to and of small structural height which is accordingly suitable for use on a table top.

It is another object of the invention to provide a device of the kind referred to by means of which the time of exposure of the light sensitive paper, on which the photographic negative is to be copied, is automatically determined in accordance with the characteristics of the paper and with the size of the image of the projected negative on the paper.

It is yet another object of the invention to provide an instrument of the kind referred to which gives the operator an overriding influence on said automatically determined exposure.

It is still another object of the invention to provide an instrument of the kind referred to which permits focussing of the image of the negative to be copied on the plane to be occupied by the light sensitive paper, without starting the automatic timing cycle.

With these and other objects in view we provide a device for he optical copying of photographic negatives, comprising in combination: a casing, a light-permeable support for the light sensitive paper and an image frame arranged on top of the said casing, a photo-electric cell arranged within the said casing, a condenser electrically connected to the said photo-electric cell and charged by the photo-current thereof produced as a function of the quantity of light penetrating from an external light source of a photographic projector through the said light-sensitive paper and light-permeable support thereof to the said photo electric cell, and a switching relay arrangement electrically connected to the said condenser and to the said external light source automatically discharging the said condenser upon its attaining a predetermined voltage, and by the discharge current thereof switching off the said external light source, the said casing, light-permeable support, photo electric cell, condenser and switching relay arrangement forming a structural unit with the said image frame.

Preferably the electrical switching elements and the said photo electric cell are arranged along the margins of the said casing, in the center of which a reflector is arranged which reflects the light penetrating from the said external light source through the light sensitive paper and light-permeable support to the photo-electric cell.

These and other objects and features of our invention will be clearly understood from the following description which, by way of example, illustrates an embodiment thereof, with reference to the accompanying drawings, in which.

Figure 1:
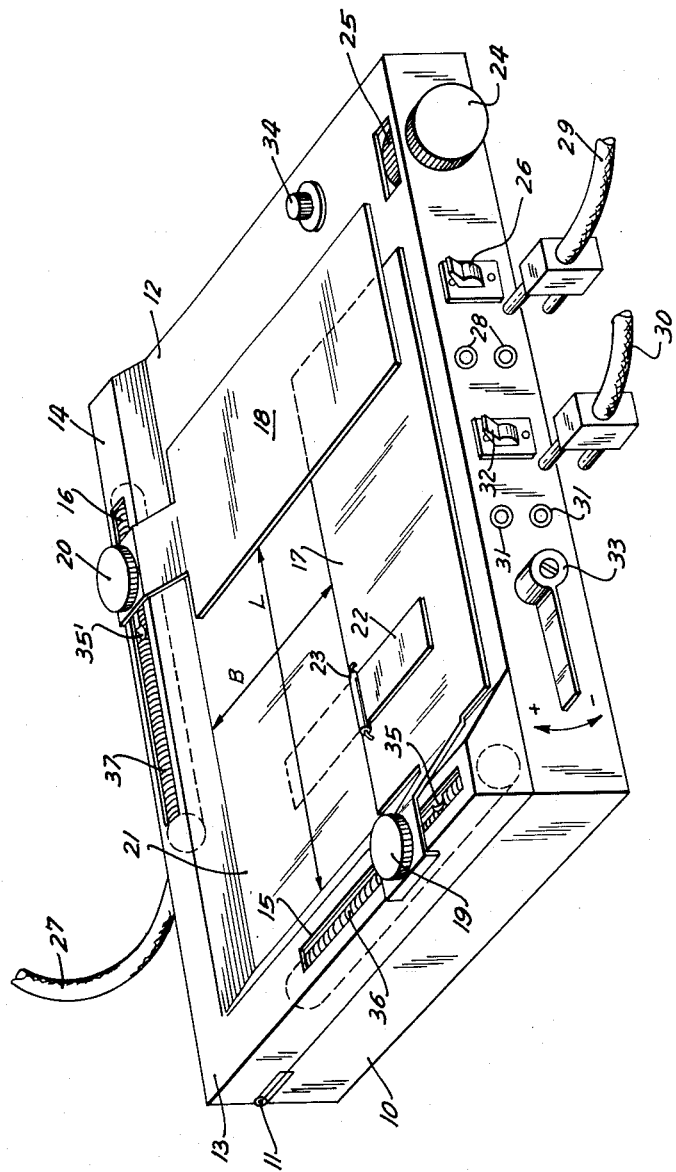
FIG. 1 shows a device of the invention in perspective top view.
Figure 2:
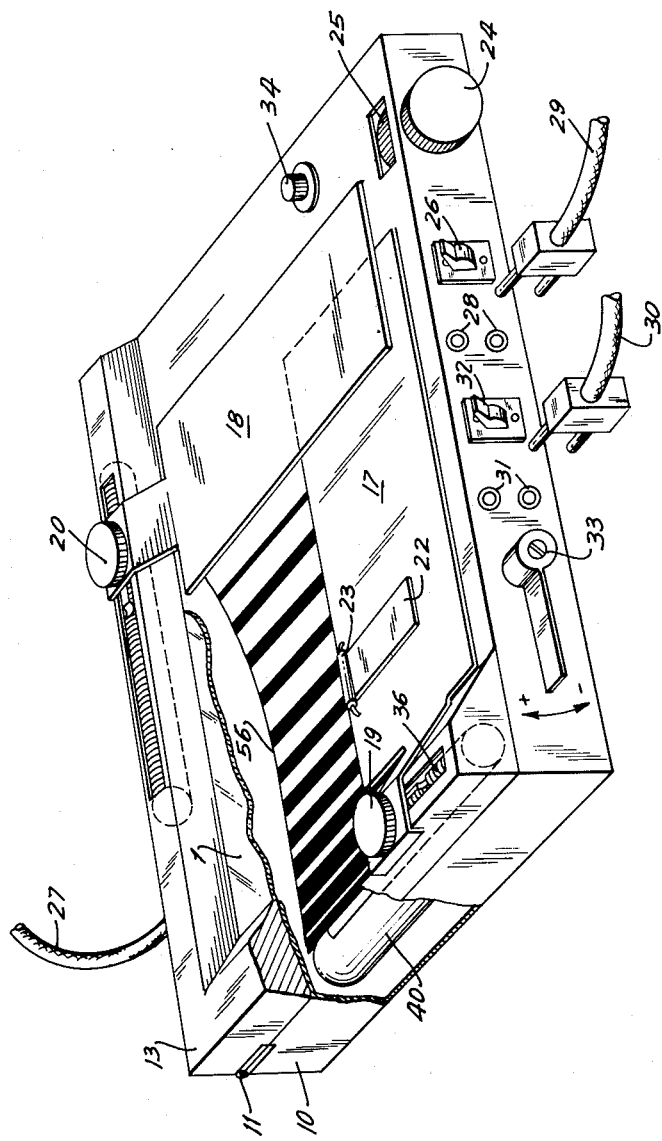
FIG. 2 is a view similar to FIG. 1 with the cover plate and parts of the margin portions broken off.

With reference to FIGS. 1 and 2, the device of the invention consists of a relatively low casing 10, on which a lid 12 is tiltably mounted by means of hinges 11. In the cambered marginal portions 13 and 14 of the cover, slots 15 and 16 are provided for masks 17 and 18 which can be shifted after loosening of the fixing screws 19 and 20. Thereby the length L and width B of an image frame 21 can be varied. That part of the lid 12 which remains free when the image frame is adjusted to its maximum possible size, forms a light-permeable cover plate, for example a ground-glass screen 1, on which a photo paper 2 is placed with the sensitive layer up (see FIGS. 3, 4) of this sensitive layer an image of a film to be enlarged is projected in a usual manner by an enlarger apparatus suspended on a support. Focussing is facilitated by a plate 22 which is articulated by means of the hinge 23 on the mask 17, so that it can be tilted into the image frame 21. That side of the focussing plate 22, which is directed upward in the rest position illustrated in full lines, is black, whereas the other side is pure white. After focussing, the plate 22 is folded back into the rest position and the photo paper 2 is inserted, the size of the image frame desired being determined by the position of the masks 17 and 18. A photo cell 40 is built into the casing 10 below an edge of the cover plate 1. The photocell 40, in conjunction with an amplifier system, converts the light entering through the image frame, the photo paper and the light permeable ground glass screen, into a charging current for a condenser. According to the intensity of this current the condenser is charged up more or less quickly to a predetermined voltage, whereupon the light source of the enlarger apparatus is switched off by a control switch arrangement, the resulting exposure period being controlled by the image luminosity and the sensitivity of the layer.

The sensitivity of the layer and the light permeability of the photographic paper selected can be taken into account as an empirical in coefficient for the paper concerned. Since with a high sensitivity the period of exposure has to be reduced, and since a high light-permeability increases the charging current, these two properties are to be taken into account in the same sense. The resulting paper coefficient can be set on an adjustment button 24, and can be read from a scale 25.

The device is made ready for operation by closing the main switch 26, and it is thereby connected to the alternating current mains through the cable 27. The connector cable 29 for the enlarger apparatus is connected to the terminal sockets 28, while the connector cable 30 for the illumination of the dark room is connected to the pair of terminals 31.

The adjustment switch 32 permits the light source of the enlarger apparatus to be switched on without starting the device for the automatic control of exposure. The plate 22 is then pivoted about its hinge 23 into the image frame, and the enlarger is focussed. A switch handle 33 which is held by springs in the middle position illustrated, causes when displaced towards the plus-position an increase of the exposure period as compared to that determined by the position of the other adjustment members, while turning the switch 33 towards the minus-position results in a shortening of the exposure period so that the operator is given the opportunity of varying the exposure period at will. A starter button 34, when temporarily depressed, starts the device for the automatic control of the exposure period. The illumination of the dark room is switched off and the light source of the enlarger is switched on, the condenser is charged up and switches the light source of the enlarger off after a certain period, as will be described later, and at the same time again switches on the illumination of the dark room. The masks 17 and 18 are fixedly connected with sliding contacts 35 and 35' of voltage divider resistances 36 and 37 the exposure period is automatically adjusted to the correct value for each image size.

Figure 3:
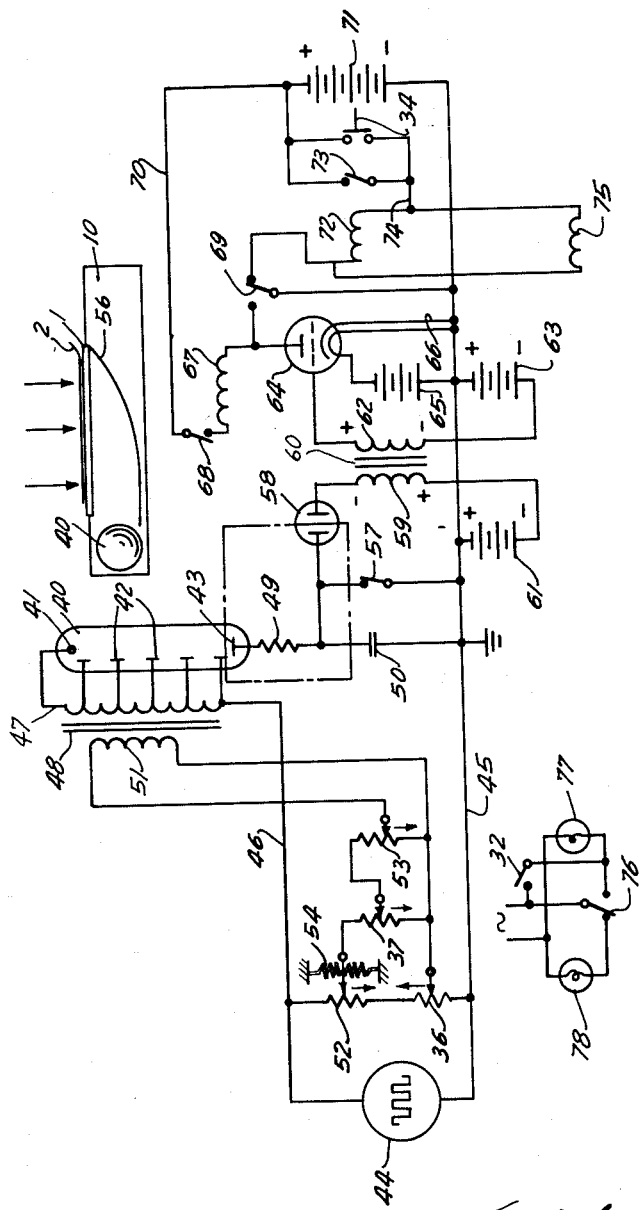
FIG. 3 shows a simplified electric wiring diagram of the device of FIGS. 1 and 2.

With reference to FIG. 3, the basic principle of operation of the device will now be explained. A photo multiplier tube 40 comprises a photo cathode 41, a number of baffle electrodes 42 and a collector electrode or anode 43. A source 44 for a rectangular alternating voltage, i.e. sinusoidal voltage with the amplitude peeks cut off, has one terminal connected to the ground wire 45, and another terminal connected by the conductor 46 to one terminal of the secondary coil 47 of a tapped transformer 48. The use of alternating voltage permits the use of transformers for obtaining different voltages. The photo cathode 41 is connected to the other terminal of coil 47, and each of the baffle electrodes 42 is connected with an intermediate tap of the coil 47. The anode 43 of the photo multiplier tube is connected through a current limiting resistance 49 and a condenser 50 to the ground wire 45. The voltage of the source 44 is thus applied to the last of the baffle electrodes and to the anode, the impedances of the resistance 49 and of the condenser 50 being negligibly small as compared with the internal resistance of the cell. The transformer 48 is energized by the primary coil 51 which is connected to the source of voltage 44 through a multiple voltage divider arrangement. This voltage divider arrangement comprises four voltage divider resistances or potentiometers 36, 37, 52 and 53, the movable contact of the potentiometer 36 being coupled with the mask 17 for adjustment of the width to the image frame, and the movable contact of the potentiometer 37 being coupled with mask 18 for the adjustment to the length of the image frame. The movable contact of the potentiometer 52 is held in a center position by the springs 54, and can be displaced from this center position by a handle 33. The moving contact of the potentiometer 53 is coupled to the adjustment knob 24. When the apparatus is adjusted for an image size and the correction handle 33 is not moved, the voltage at the terminals of the coil 51, and accordingly at the baffle electrodes and at the photo cathode depends on the adjustment of the knob 24. The cathode is exposed to the light which penetrates through the photographic paper 2 and the light-permeable ground glass screen 1 into the photo multiplier tube 40. This tube 40 is arranged under the stationary marginal portion 13 of the image frame 21 in order to reduce the height of the casing as far as possible, as will be seen in FIG. 2. In this manner, considerable structural height can be saved as compared with known arrangements, in which a photo electric cell is arranged centrally below the cover plate. All other operating elements are also arranged along the margins of the casing. In order that the light, which falls through portions of the cover plate 1 adjacent to the tube 40, and the light which falls through portions of the cover plate remote from the tube, may act on the photo cathode 41 to the same extent, a black-and-white screen plate 56 which curves up towards the cover plate and whose content in white increases with increasing distance from the photo electric cell is arranged on the bottom of the device. In FIG. 2, uneven distribution of black and white on the screen plate 56 is indicated by a corresponding distribution of stripes. The same effect could alternatively be attained placing a grid plate under the ground glass screen 1. The grid plate would have to be so designed that in the neighborhood of the photo multiplier tube it weakens the passage of light, and that it favors the passage of light in regions more remote from the tube.

In those phases of the alternating voltage in which the photo cathode 41 and the baffle electrodes 42 have a negative charge relative to the anode 43, current flows through the resistance 49 to one of the plates of the condenser 50 the other plate of which is connected to the ground wire 45. The intensity of this current for a given quantity of light acting on the cathode 41 depends primarily on the voltage of the baffle electrodes 42, i.e. on the voltage at the terminals of the coil 51. Any shifting of the movable contact of the potentiometer 53 in the direction of the arrow reduces this voltage. The adjustment knob 24, when being turned to a higher coefficient of the photographic paper, adjusts the position of the moving contact in the direction of this arrow. Any adjustment of the moving contact of the potentiomemter 52 in opposition to the restoring forces of the springs 54 in the direction of the arrow likewise reduces the voltage on the coil 51, i.e. the charging current for a given quantity of light. The movable contacts of the potentiometers 36 and 37, also reduce the input voltage for the coil 51 when displaced in the direction of the arrows and thereby reduce the charging current for a given light condition. The coupling of the movable contacts with the masks 17 and 18 is such that the anode current is reduced when the image size is increased because in this case more light falls on the cathode 41. According to the intensity of the charging current, the condenser 50 is loaded more or less quickly to a predetermined voltage, and it should be noted that the relay contact 57 is opened in a manner to be described later when the device is in operation, said contact being shown in the rest position. One electrode of a glow discharge tube 58 is connected to the anode side of the condenser 50 whereas the other electrode is connected to the ground wire 45 over the primary coil 59 of a pulse reversing transformer 60 and a source 61 of a negative bias voltage. When a predetermined voltage of the condenser 50 is reached, the glow discharge tube 58 strikes, and a current pulse flows through the coil 59. The control grid of the thyratron tube 64 is connected over the secondary coil 62 of the transformer 60 and a source of negative bias voltage 63 to the ground wire. Its heating filament is heated from the source of voltage 65, while its cathode is connected to ground over the conductor 66. The anode of the thyratron 64 is in circuit wtih the positive terminal of a source of voltage 71 over the exciter coil of a relay 67 and a contact 68 of this relay as well as a conductor 70. This anode is also in circuit with one of the stationary contacts of a double-pole contact 69 of this relay 67. The exciter coil of a further relay 72 to which belong the contacts 57 and 73 is in circuit with the other stationary contact of the aforesaid double-pole contact 69 and with a conductor 74, to which the contact 73 and one of the stationary contacts of the push button switch 34 are connected. The positive terminal of the current source 71 is connected to the opposite contacts of the switches 73 and 34. The exciter coil of a third relay 75 is connected to the positive terminal of the current source 71 over the holding contact 73, and with the ground wire 45 over contact 69. The two stationary contacts of a starting switch 34 are connected to the conductor 74 and to the positive terminal of the current source 71, respectively. When the pushbutton switch 34 is temporarily actuated, the coil of the relay 72 is therefore supplied with current over the following circuit:

Positive pole of the current source 71—pushbutton switch 34—conductor 74—coil of relay 72—double-pole contact 69—ground.

By the excitation of the relay 72 its holding contact 73 is closed, so that the relay 72 remains excited.

At the same time the relay 75 is excited over the following circuit:

Positive terminal of the current source 71—holding contact 73—conductor 74—relay 75—double-pole contact 69—earth.

By the excitation of the relay 75 its double-pole contact 76 is switched, so that instead of the dark room lamp 78 the lamp 77 of the enlarger is connected to the alternating current mains. The thyratron valve 64 remains blocked for the time being, because its grid has a negative bias. When after a certain time the voltage on the condenser 50 has reached a sufficiently high value, the glow discharge tube 58 strikes, whereby a current flows over the coil 59 and the battery 61 to ground. The negative bias of the glow discharge tube 58 limits the effect of manufacturing variations, which could cause a shifting of the striking voltage by several volts, and corresponding variations of the charging time required. The current pulse in the coil 59 induces in the coil 62 a voltage pulse which makes the thyratron grid positive, so that current flows in the anode circuit thereof. The relay 67 is thereby excited, and accordingly switches its contacts 68 and 69. By the opening of the contact 68 the anode of the thyratron is separated from the source of voltage 71, so that the thyratron is extinguished. By the switching of the contact 69 the holding circuits for the relays 72 and 75 are interrupted so that they are deenergized. Thereby the holding contact 73 and the bridging contact 57 of the relay 72 drop back into their rest position illustrated, so that the condenser 50 is discharged and the holding circuit for the relays 72 and 75 is interrupted. The subsequent deenergizing of the relay 67 can therefore neither cause a renewed igniting of the thyratron nor renewed excitation of the relays 72 and 75. By the igniting of the thyratron, and by the deenergizing of the relay 75 effected thereby, the switch-over contact 76 of the latter drops back into the rest position shown, so that the light source 77 of the enlarger is again switched off, and the illumination 78 of the dark room is switched on.

The described arrangement of the condenser 50 prevents in an effective manner the formation of by-paths for the anode current of the photo electric cell 40. Merely the components enclosed in the chain-dotted framing have to be particularly well insulated, whereas for example the transformer 48 does not open any by-paths for the charging current. The light source 77 of the enlarger can be connected to the mains by the switch 32 without starting the automatic exposure controls. This allows focussing of the image.

Figure 4:
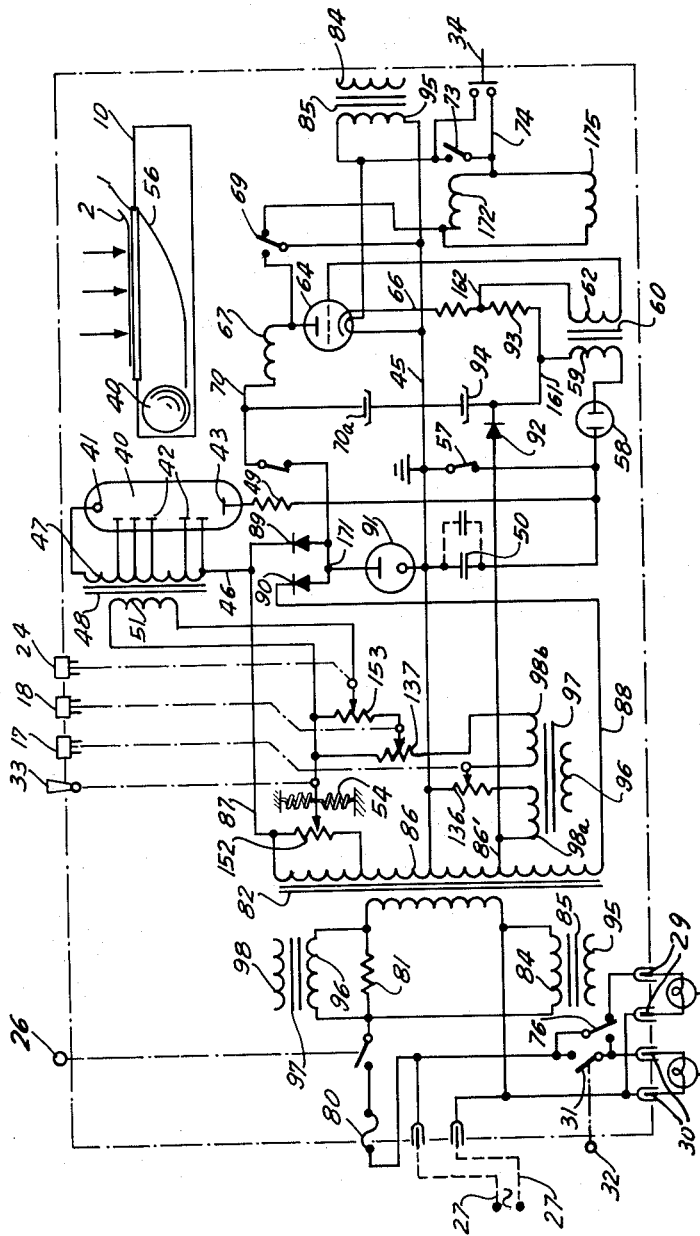
FIG. 4 shows a complete electric wiring diagram of the device of FIGS. 1 and 2.

In the scheme according to FIG. 4 those elements of the wiring diagram which are constructed exactly like those in FIG. 3, are denoted by the same reference numerals, while those which have an analogous function are referred to by a numeral increased by 100.

The various current sources are different from those shown in FIG. 3. The alternating current mains is connected over the feeder cable 27, the fuse 80, the main switch 26 and the resistance 81 to the primary coil of the transformer 82. Likewise, the primary coil 84 of the transformer 85 is connected to the mains over the switch 26. A central tap of the secondary coil 86 of the transformer 82 is connected to the ground wire 45, and the two terminals of this coil 86 are connected over the conductors 87 and 88 with respective rectifiers 89 and 90. The other terminals of these two rectifiers are connected to the ground wire 45 over a stabilisor glow discharge tube 91. By the action of the current limiting resistance 81 and of the rectifiers 90, 89 an alternating voltage with cut-off peaks, i.e. substantially a rectangular alternating voltage, is generated between the conductor 46, which is connected to the coil 47, and the ground wire 45. For generating the input voltage for the coil 51 as a function of four parameters, the four potentiometers 136, 137, 152 and 158 are provided, which, in a circuit slightly different from that according to FIG. 3, have the same functions as the voltage dividers 36, 37, 52 and 53 of FIG. 3. An intermediate tap 86' of the coil 86 is connected to a ground over the rectifier 92 and the parallel arrangement of a resistance 93 and a filter condenser 94, so that the circuit points 161 and 162 form voltage sources for negative bias voltages of the glow discharge tube 58 and the grid of the thyratron respectively. The source of positive bias voltage for the thyratron 64 is formed by the conductor 171 connecting the rectifiers 89, 90 and the stabilisor tube 91, another filter condenser 70a being arranged between the conductor 70 and the ground wire 45. The secondary coil 95 of the transformer 85 forms at the same time the current source for the heating filament of the thyratron and for the relays 172 and 175 which in this embodiment are alternating current relays. The primary coil 96 of a transformer 97 bridges over the resistance 81 and induces correcting voltages in the secondary coils 98a, 98b which voltages are supplied to the potentiometers 136 and 137. Thereby the coil 51 is supplied with an accurately rectangular voltage, because the peak voltages are transmitted inversely to the voltage divider system at the resistance 81. Otherwise the manner of operation of the arrangement illustrated in FIG. 4 conforms to that of the arrangement according to FIG. 3. Temporary actuation of the push button switch 34 excites the relays 172 and 175, the dark room illumination 78 is switched off, and the light source 77 of the enlarger is switched on. At the same time the bridging contact 57 is opened, so that the voltage on the condenser 50 begins to rise. When reaching a predetermined voltage value, the glow discharge tube 58 strikes, so that the thyratron 64 restores the original condition of the device by means of the relay 67. The characteristics of the voltage divider resistances 136, 137 are to be selected in such a manner that an increase of the image frame to twice its length, and also an increase of the image frame to twice its width have the same effect as an increase in sensitivity to twice the value. In order that the device may also be suitable for making enlargements in colour photography, the condenser 50 is advantageously made exchangeable.

Under certain circumstances, depending on the kind of glow discharge tube 58 used, it may be necessary to connect the same to earth after each use of the device by means of additional circuit members, in order that the glow discharge lamp does not strike at different voltage values of the condenser during subsequent operations, for example owing to accumulating static charges.

While we have herein described and illustrated in the accompanying drawings what may be considered a typical and particularly useful embodiment of our invention, we wish it to be understood that we do not limit ourselves to the particular details and dimensions described and illustrated, for obvious modifications will suggest themselves to a person skilled in the art.

We claim:

1. A device for the optical copying of photographic negatives, comprising, in combination: a casing, a light-permeable support for the light sensitive paper and an image frame arranged on top of said casing, said light-permeable support defining a light-accessible area thereunder in said casing, a photo electric cell arranged within the said casing outside said area; light transmitting means in said area for transmitting light passing through said light-permeable support into said casing to said photo electric cell; light attenuating means for differentially attenuating light passing through different portions of said support and transmitted to said photo electric cell in such a manner that the quantity of light transmitted to said photo electric cell is substantially proportionate to the overall quantity of light passing through said light-permeable support into said casing, a condenser electrically connected to the said photo electric cell and charged by the photo current thereof produced as a function of the quantity of light penetrating from an external light source of a photographic projector through the said light-sensitive paper and light-permeable support thereof to the said photo electric cell, and a switching relay arrangement electrically connected to the said condenser and to the said external light source automatically discharging the said condenser upon its attaining a predetermined voltage, and by the discharge current thereof switching off the said external light source, the said casing, light-permeable support, photo electric cell, condenser, and switching relay arrangement forming a structural unit with the said image frame.

2. A device for the optical copying of photographic negatives, comprising, in combination: a casing, a light-permeable support for the light sensitive paper and an image frame arranged on top of said casing, said light-permeable support defining a light accessible area thereunder in said casing, a photo electric cell arranged within the said casing outside said area; reflector means in said area for reflecting light passing through said light-permeable support onto said photo electric cell, said reflector means having a plurality of reflecting elements of varying reflectivity arranged in such a manner that the quantity of light reflected onto said photo electric cell is substantially proportionate to the overall quantity of light passing through said light-permeable support into said casing, a condenser electrically connected to the said photo electric cell and charged by the photo current thereof produced as a function of the quantity of light penetrating from an external light source of a photographic projector through the said light-sensitive paper and light-permeable support thereof to the said photo electric cell, and a switching relay arrangement electrically connected to the said condenser and to the said external light source automatically discharging the said condenser upon its attaining a predetermined voltage, and by the discharge current thereof switching off the said external light source, the said casing, light-permeable support, photo electric cell, condenser, and switching relay arrangement forming a structural unit with the said image frame.

3. A device for the optical copying of photographic negatives, comprising, in combination: a casing, a light-permeable support for the light-sensitive paper and an image frame arranged on top of said casing, said light-permeable support defining a light-accessible area thereunder in said casing, a photo electric cell arranged within the said casing and laterally offset from the center of said area; reflector means in said area for reflecting light passing through said light-permeable support onto said photo electric cell in such a manner that the mean intensity of light reflected to said photo electric cell is proportionate to the mean of light intensities passing through different portions of said light permeable support into said casing and irrespective of the distance of said different portions from said photo electric cell, a condenser electrically connected to said photo electric cell and charged by the photo current thereof produced as a function of the quantity of light penetrating from an external light source of a photographic projector through the said light-sensitive paper and light-permeable support thereof to the said photo electric cell, and a switching relay arrangement electrically connected to the said condenser and to the said external light source automatically discharging the said condenser upon its attaining a predetermined voltage, and by the discharge current thereof switching off the said external light source, the said casing, light-permeable support, photo electric cell, condenser, and switching relay arrangement forming a structural unit with the said image frame.

4. A device for the optical copying of photographic negatives, comprising, in combination: a casing, a light-permeable support for the light-sensitive paper and an image frame arranged on top of said casing, said light-permeable support defining a light-accessible area thereunder in said casing, a photo electric cell arranged within the said casing outside said area and laterally offset therefrom; curved reflector means in said area for reflecting light passing through said light-permeable support onto said photo electric cell, said reflector means extending arcuately from one area adjacent said light-permeable support and more remote from said photo electric cell to another area nearer said photo electric cell and remote from said light-permeable support and having a plurality of elements of varying reflectivity arranged in such a manner that the overall reflectivity of said reflector means decreases from said one area towards said other area, whereby the quantity of light passing through said light-permeable support and received by said photo electric cell is substantially proportionate to the overall quantity of light passing through said light-permeable support into said casing, a condenser electrically connected to the said photo electric cell and charged by the photo current thereof produced as a function of the quantity of light penetrating from an external light source of a photographic projector through the said light-sensitive paper and light-permeable support thereof to the said photo electric cell, and a switching relay arrangement electrically connected to the said condenser and to the said external light source automatically discharging the said condenser upon its attaining a predetermined voltage, and by the discharge current thereof switching off the said external light source, the said casing, light-permeable support, photo electric cell, condenser, and switching relay arrangement forming a structural unit with the said image frame.

5. Apparatus for the optical copying of photographic negatives comprising, in combination, a casing; a light-permeable support for the copying paper and an image frame arranged on top of said casing; a photo-electric cell arranged within said casing, said photo-electric cell including a photo cathode, a collector anode and a plurality of baffle electrodes providing electron amplification; a voltage source for applying voltage to said baffle electrodes; adjustable electrical control members connected in circuit with said baffle electrodes and said voltage source for controlling the voltage applied to said baffle electrodes; a capacitor connected in circuit with said photo electric cell and charged by the current thereof produced as a function of the quantity of light passing through the copying paper from an external light source to said photo-electric cell; a source of substantially rectangular alternating voltage connected in circuit with the last of said baffle electrodes and one plate of said capacitor, the other plate of said capacitor being connected to said collector anode of said photo-electric cell; a feeder transformer having a secondary coil with a plurality of taps connected to the respective baffle electrodes, and having a primary coil connected to said source of substantially rectangular alternating voltage; and a switching relay arrangement connected in circuit with said capacitor and the external light source for automatically discharging said capacitor when the same reaches a predetermined voltage, the discharge current of said capacitor switching off the external light source, said casing, light-permeable support, photo-electric cell, capacitor and switching relay arrangement forming a structural unit with the image frame.

6. A device as claimed in claim 5, wherein the said source of a substantially rectangular alternating voltage contains an alternating current transformer having a primary coil and a secondary coil, the latter being electrically symmetrically disposed relative to mass, two rectifiers and a glow discharge valve, each end of the said secondary coil being connected to mass over one of the said rectifier and the said glow discharge valve in common to them, and the last of the said baffle electrodes of the electronic amplifier of the said photo electric cell being connected to one of the said ends, the collector anode of the said photo electric cell being connected over the said condenser to mass, the primary coil of the said transformer being connected to alternating current means, and moreover comprising a current limiting resistance connected in series with the said primary coil cutting off the voltage peaks and a multiple voltage divider arrangement connected to the said feeder transformer for the said photo electric cell, and providing a controllable part-voltage thereto.

7. A device as claimed in claim 6, comprising in addition: a correction transformer connected to the said current limiting resistance and transforming the voltage generated across the said resistance back into the said voltage divider arrangement with inverted phase as simulating thereby the said substantially rectangular feeder voltage of the said feeder transformer for the said photo electric cell to a truly rectangular alternating voltage.

8. A device as claimed in claim 6, comprising in addition: an impulse reversing transformer and another glow discharge valve, the said collector anode of the said photo electric cell being connected over the said other glow discharge valve and over the primary coil of the said impulse reversing transformer to an external direct negative voltage source.

9. A device as claimed in claim 8, comprising in addition: a thyratron valve, a relay having a coil and switching contacts, a starting switch, the said thyratron valve having a control grid connected over the secondary coil of the said impulse reversing transformer to an external direct negative voltage source, and an anode connected through the said relay coil to an external direct positive voltage source, the said switching relay arrangement being electrically connected to and energized by the operation of the said starter switch and thereby switching off an external illumination for the dark room and switching on the said external light source of the photographic projector, the said relay extinguishing the said thyratron valve again after the same has struck, and switching off the said switching relay arrangement from its external source of supply current.

10. Apparatus for the optical copying of photographic negatives comprising, in combination, a casing; a light-permeable support for the copying paper and an image frame arranged on top of said casing; a photo-electric cell arranged within said casing; a capacitor connected in circuit with said photo-electric cell and charged by the current thereof produced as a function of the quantity of light passing through the copying paper from an external light source to said photo-electric cell; shiftable masks arranged on said casing for defining the length and width of said image frame; a switching relay arrangement connected in circuit with said capacitor and the external light source for automatically discharging said capacitor when the same reaches a predetermined voltage, the discharge current of said capacitor switching off the external light source; and adjustable electrical control members respectively mechanically coupled with each of said shiftable masks and connected in circuit with said capacitor for counterbalancing any effect due to an increased quantity of light passing through said photo-copying paper due to the adjustment of said masks to an increased size of image frame, said casing, light-permeable support, photo-electric cell, capacitor and switching relay arrangement forming a structural unit with the image frame.

11. Copying apparatus in accordance with claim 10 wherein said photo-electric cell and the switching relay arrangement are arranged along the walls of the casing providing a chamber beneath the copying paper, a reflector arranged in said chamber for reflecting light passing through the copying paper towards the photo-electric cell, said reflector including light attenuating means between the plane of the copying paper and the photo-electric cell so that light which passes through the copying paper and is reflected by the reflector to the photo-electric cell is attenuated an amount inversely proportional to the length of the path traveled by the light.

12. Copying apparatus in accordance with claim 10 wherein the photo-electric cell has an anode and is provided with built-in baffle electrodes for electron amplification, the anode circuit of said cell being formed as the charging current circuit for said capacitor, voltage varying means connected to said electrical control members for changing the voltage on said baffle electrodes in accordance with the light-sensitivity and light-permeability of the copying paper, said control members including two voltage varying members coupled with said shiftable masks and a third voltage varying member for independently changing the illumination time of the copying paper whenever desired.

13. Apparatus for the optical copying of photographic negatives comprising, in combination, a casing; a light-permeable support for the copying paper and an image frame arranged on top of said casing; a photo-electric cell arranged within said casing; a capacitor connected in circuit with said photo-electric cell and charged by the current thereof produced as a function of the quantity of light passing through the copying paper from an external light source to said photo-electric cell; a switching relay arrangement connected in circuit with said capacitor and the external light source for automatically discharging said capacitor when the same reaches a predetermined voltage, the discharge current of said capacitor switching off the external light source; adjustable electrical control members connected in series with said capacitor; and a scale calibrated in accordance with the light-sensitivity and light-permeability of the copying paper arranged on said casing in juxtaposition to said adjustable electrical control members, said adjustable control members controlling the time period for charging said capacitor to its predetermined voltage in accordance with the characteristic of said copying paper as indicated on said scale, said casing, light-permeable support, photo-electric cell, capacitor and switching relay arrangement forming a structural unit with the image frame.

14. Copying apparatus in accordance with claim 13 wherein the control members include additional correcting members, adjusting means coupled to said correcting members for changing the illumination time of the copying paper by the external light source independently, said adjusting means being provided with resilient biasing members for returning said adjusting means to an inoperative position when the same is not in use.

15. Copying apparatus in accordance with claim 13, wherein said photo-electric cell is arranged underneath said image frame between the inner edge thereof and one of the walls of said casing providing a chamber beneath the copying paper, and a reflector is arranged in said chamber for uniformly reflecting light passing through the copying paper towards said photo-electric cell.

16. An auxiliary apparatus for the optical copying of photographic negatives, comprising, in combination, a casing; shiftable masks for selectively adjusting the size of the image frame on the copying paper; a photoelectric cell arranged in the casing so that light coming from a projection light source and passing through the image frame of the copying paper uniformly impinges on said photo-electric cell; a capacitor connected in circuit with said photo-electric cell so as to be charged by the current produced thereby, which current is a function of the mean brightness of the desired image frame; electrical control apparatus connected in circuit with said capacitor and with the projection light source for switching off the projection light source after a time period determined by the amount said capacitor is charged by the current produced in the photo-electric cell; and electrical control members mechanically coupled to said electrical control apparatus and said shiftable masks for changing the charging current circuit of said capacitor to automatically compensate for any change in the size of said image frame defined by said shiftable masks.

17. Auxiliary apparatus in accordance with claim 16 wherein said photo-electric cell and the electrical control members for the control arrangement are arranged along the walls of the casing providing a chamber beneath the copying paper, and a reflector arranged in said chambers for reflecting light passing through the copying paper towards said photo-electric cell.

18. In a device for the optical copying of photographic negatives, in combination, a casing; a light-permeable support for a light-sensitive paper and an image frame arranged on top of said casing, said light permeable support defining a light-accessible area thereunder in said casing; a photo electric cell arranged within said casing outside said area; and light attenuating and directing means in said area for differently attenuating light passing through different portions of said support and for directing the light to said photoelectric cell in such a manner that the mean intensity of light transmitted through said light-permeable support and directed to said photo electric cell is substantially proportionate to the mean of the light intensities passing through different portions of said light permeable support into said casing and irrespective of the distance of said different portions from said photoelectric cell.

19. A device as defined in claim 18 in which said light attenuating and directing means are constituted by reflector means positioned below said light-permeable support and having a plurality of reflecting elements of varying reflectivity arranged in such a manner that the mean intensity of light reflected onto said photoelectric cell is substantially proportional to the mean of the light intensities passing through different portions of said light permeable support into said casing and irrespective of the distance of said different portions from said photoelectric cell.

20. A device as defined in claim 18 in which said photoelectric cell is arranged within said casing outside said area and laterally offset therefrom and in which said light attenuating and directing means are constituted by curved reflector means positioned below said light-permeable support and extending arcuately from one area adjacent said light permeable support and more remote from said photoelectric cell to another area nearer said photoelectric cell and remote from said light permeable support and having a plurality of elements of varying reflectivity arranged in such a manner that the overall reflectivity of said reflector means decreases from said one area toward said other area.

21. In a device for the optical copying of photographic negatives, in combination, a casing; a light permeable support for a light-sensitive paper and an image frame arranged on said casing; a photoelectric cell arranged within said casing so that the lengths of the paths of light passing through different portions of said light permeable support to said photoelectric cell are different; and light attenuating and directing means for differently attenuating light passing through different portions of said support and for directing the light to said photoelectric cell in such a manner that, in the event equal amounts of light pass through different portions of said support, the amounts of light received by said photoelectric cell from said different portions will be equal and irrespective of the length of the light path from the respective portion to said photoelectric cell.

References Cited in the file of this patent

UNITED STATES PATENTS

| | | |
|---|---|---|
| 1,939,243 | Twyman | Dec. 12, 1933 |
| 1,953,471 | Eich | Apr. 3, 1934 |
| 2,165,965 | Gaebel et al. | July 11, 1939 |
| 2,484,299 | Labrum | Oct. 11, 1949 |
| 2,651,866 | Tuttle | Sept. 15, 1953 |